United States Patent [19]

Gullichsen

[11] Patent Number: 4,776,758
[45] Date of Patent: Oct. 11, 1988

[54] COMBINED FLUIDIZING AND VACUUM PUMP

[75] Inventor: Johan Gullichsen, Sjundea, Finland
[73] Assignee: Kamyr AB, Karlstad, Sweden
[21] Appl. No.: 70,220
[22] Filed: Jul. 6, 1987
[51] Int. Cl.[4] ............................................. F01D 25/32
[52] U.S. Cl. .................................. 415/168; 415/121 A; 55/203
[58] Field of Search .................... 415/168, 169, 121 A; 55/203

[56] References Cited

U.S. PATENT DOCUMENTS

| | | | |
|---|---|---|---|
| 3,180,568 | 4/1965 | Oettle | 415/169 |
| 3,230,890 | 1/1966 | Yokota et al. | 415/169 |
| 4,256,436 | 3/1981 | Fandrey et al. | 415/168 |
| 4,273,562 | 6/1981 | Niskanen | 55/52 |
| 4,410,337 | 10/1983 | Gullichsen et al. | 55/203 |
| 4,414,006 | 11/1983 | Armstrong | 55/203 |
| 4,435,193 | 3/1984 | Gullichsen et al. | 55/21 |

FOREIGN PATENT DOCUMENTS

| | | | |
|---|---|---|---|
| 1049363 | 1/1959 | Fed. Rep. of Germany | 55/203 |
| 200016 | 7/1923 | United Kingdom | |
| 200150 | 7/1923 | United Kingdom | |
| 192365 | 12/1923 | United Kingdom | |
| 218995 | 10/1924 | United Kingdom | |
| 996012 | 6/1965 | United Kingdom | 55/203 |

Primary Examiner—Robert E. Garrett
Assistant Examiner—John T. Kwon
Attorney, Agent, or Firm—Nixon & Vanderhye

[57] ABSTRACT

A pump for medium consistency suspensions (e.g. 6–15%), such as paper pulp, simultaneously pumps and degasses the suspension. A common shaft mounts a fluidizing impeller and a vacuum pump impeller and a common wall with gas exhaust passageways is disposed between the fluidizing pump housing and vacuum pump housing. Gas separated from the suspension flows through the gas passageways in the common wall, through the vacuum pump, past the vacuum impeller, and is expelled out the opposite side of the vacuum pump from the gas inlet passageways. A pressure responsive valve provides make-up air to the vacuum pump if the vacuum pulled is too strong, to prevent suspension from being pulled through the vacuum pump. A liquid inlet supplies liquid in the vacuum pump to define a liquid ring, the inner periphery of the ring defined by the expelled gas outlet.

17 Claims, 3 Drawing Sheets

COMBINED FLUIDIZING AND VACUUM PUMP

BACKGROUND AND SUMMARY OF THE INVENTION

It has been commercially demonstrated that a very effective way to handle suspensions, such as paper pulp, it at medium consistency (that is about 6-15% solids consistency). When pumped, mixed, screened, and otherwise handled in this manner, significant savings in equipment, dilution liquids, and the like can be achieved. One piece of equipment that has been particularly successful in allowing handling of medium consistency suspensions is a fluidizing pump which simultaneously pumps and degassing the suspension. Typically, such pumps utilize a separate vacuum pump, piping from the fluidizing pump to the vacuum pump, a separate motor and motor mount for the vacuum pump, etc., in order to exhaust the gas that is separated from the suspension so that the suspension may be effectively pumped by the fluidizing pump impellers.

According to the present invention, it has been found that it is possible to mount a vacuum pump on the same shaft as the fluidizing pump impeller, and pull the separated gas directly into the vacuum pump. It has surprisingly been found that this can be accomplished according to the invention without redesign of the fluidizing pump impeller, change in the size of the motor for rotating the pump, or change in any other significant feature of conventional fluidizing pumps. The invention thus achieves the significant advantage of eliminating piping and an entirely separate pump, motor, motor mount, etc. with ensuing reduction in costs, and increased ease of operation.

According to one aspect of the invention there is provided a pump comprising: a main housing including a suspension inlet and a suspension outlet generally transverse to the suspension inlet; a shaft rotatable about an axis of rotation generally in alignment with the inlet; a fluidizing impeller mounted to the shaft for rotation with it, for effecting fluidization of suspension pumped by the impeller from the inlet to the outlet, the fluidizing impeller comprising a first section having impeller blades elongated in a first dimension generally parallel to the axis of rotation, and comprising second impeller blade portions extending in a dimension generally perpendicular to the first impeller blade portions, the fluidizing impeller when rotating causing gas to separate from the suspension and to collect adjacent the shaft and the second impeller blade portions; a vacuum pump including a vacuum impeller, the vacuum impeller mounted to the shaft for rotation with the shaft and the fluidizing impeller; and means defining gas passageways extending between the main housing where gas collects to the vacuum impeller, to be exhausted from the main housing, to an area remote from the main housing, by the vacuum pump. Preferably a common wall divides the fluidizing pump from the vacuum pump, with a gas passage formed in the common wall, and an annular open volume defined in that wall. A source of make-up air, controlled by a pressure responsive valve, communicates with the annular volume to provide make-up air should the vacuum pulled by the vacuum pump be greater than a predetermined amount. This avoids the possibility that suspension may be pulled in the vacuum pump if the vacuum is too high. Further, the gas exhausted from the fluidizing pump passes generally parallel to the axis of rotation and is discharged from the vacuum pump in a portion thereof opposite from the fluidizing pump. Liquid for the liquid ring of the vacuum pump is supplied through a liquid inlet, and the gas outlet defines the inner edge of the water ring. Any excess liquid from the liquid ring, and expelled gas, pass through the gas outlet.

According to another aspect of the present invention there is provided a method of simultaneously pumping and degassing a suspension having a solids content between about 6-15% utilizing a fluidizing impeller in a main housing rotatable by a shaft, and a vacuum impeller mounted on the same shaft as the fluidizing impeller. The method comprises the steps of: Feeding the suspension having a consistency between about 6-15% into operative association with the fluidizing impeller. Rotating the fluidizing impeller continuously at high speed, the impeller effecting pumping of the suspension and removing gas from the suspension, the gas tending to collect adjacent the shaft. And, withdrawing the gas from its collecting volume with the vacuum pump, the gas being pulled from the collecting volume generally parallel to the axis of rotation, through the vacuum pump past the vacuum pump impeller, and expelled from the opposite side of the vacuum pump as the fluidizing impeller.

It is the primary object of the present invention to provide for the simplified but effective removal of gas from a fluidizing medium consistency suspension pump. This and other objects of the present invention will become clear from an inspection of the detailed description of the invention and from the appended claims.

DETAILED DESCRIPTION OF THE INVENTION

Figure 1:
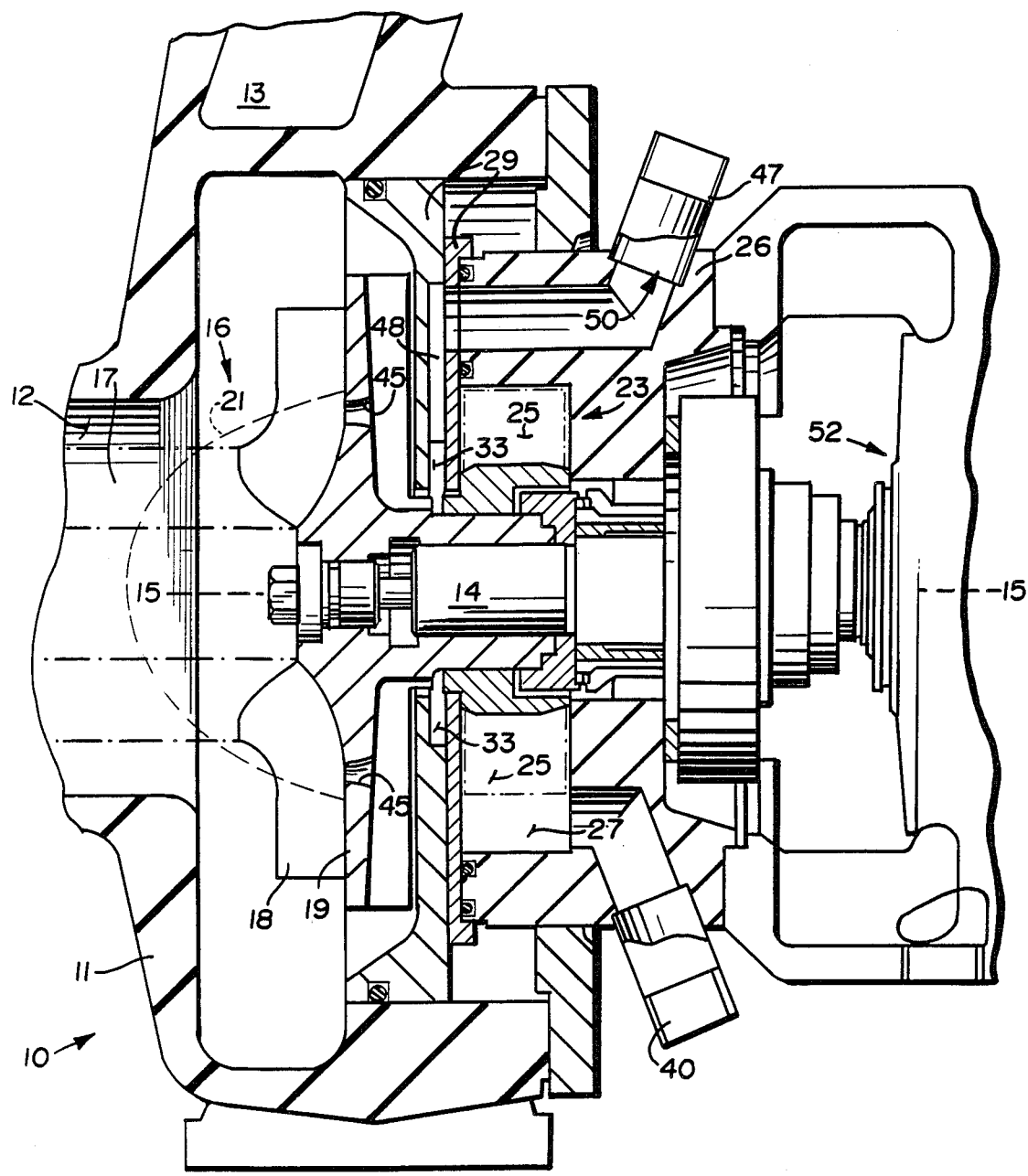
FIG. 1 is a vertical cross-sectional view of an exemplary pump according to the present invention, with a number of conventional features thereof cut away.
Figure 3:
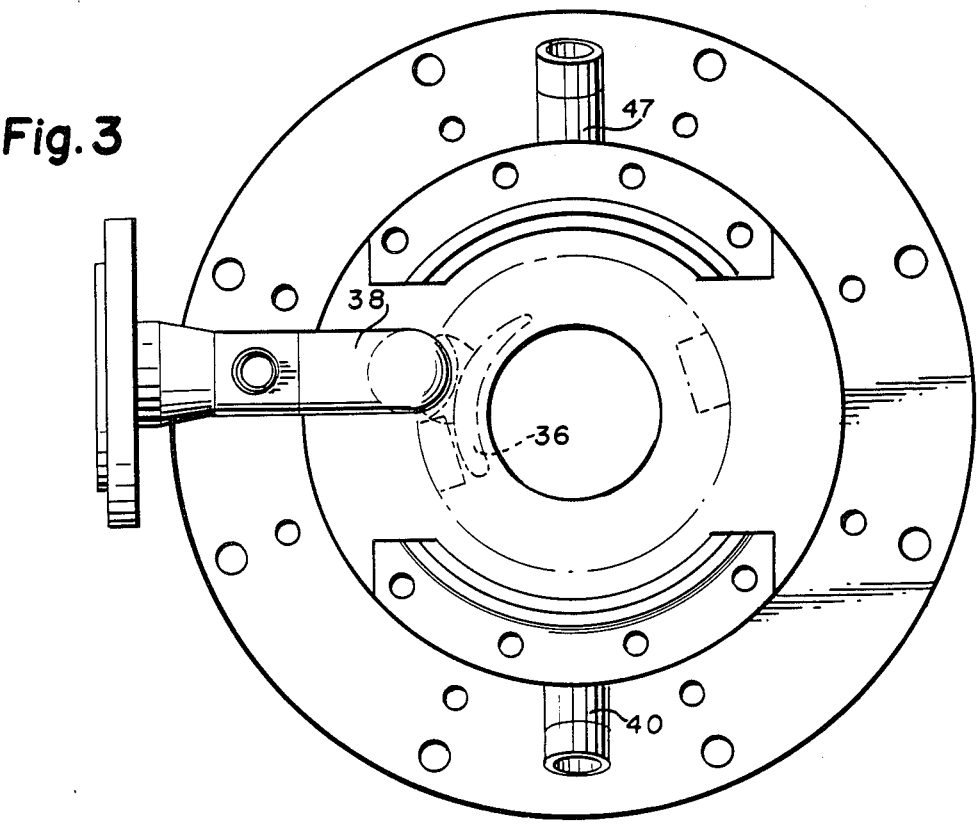
FIG. 3 is a is a bottom plan view, with motor and shaft removed for clarity of illustration, of the pump of FIGS. 1 and 2.

A pump according to the present invention is shown generally by reference numeral 10 in FIGS. 1 and 3. The pump comprises a main housing portion 11 including a suspension inlet located upstream of the reference number 12 in FIG. 1, a suspension outlet 13; a shaft 14 rotatable about an axis of rotation 15—15 generally in alignment with the inlet 12; a fluidizing impeller 16 including first impeller blade portions 17 extending generally parallel to the axis 15—15, and second impeller blade portions 18 mounted on a disc 19 and extending generally transverse to the first portions 17. During operation of the fluidizing pump, gas is separated from the suspension and tends to collect in a bubble shown in dotted line by reference numeral 21 in FIG. 1, the bubble formed adjacent the shaft 14 and the second impeller blades 18.

What has been described so far is conventional in commercial pumps sold under the trademark "MC" by Kamyr, Inc. of Glens Falls, N.Y. and Kamyr AB of Karlstad, Sweden, and which are shown in U.S. Pat. Nos. 4,435,193 and 4,410,337.

According to the present invention, removal of the gas in bubble 21 is effected by a simplified apparatus by utilizing a vacuum pump, shown generally by reference numeral 23 in the drawings, commonly mounted to shaft 14. The vacuum pump 23 includes an impeller 24 (see FIG. 4) having impeller blades 25 mounted for rotation with shaft 14 in housing 26, off center to the housing cavity (vacuum pump chamber) 27 which contains the impeller 24. The vacuum pump impeller 24 is essentially a conventional impeller, such as one manufactured by the Nash Engineering Company of Connecticut. The impeller 24 typically includes no wall portions extending generally transverse to the shaft 14, and defining the outer "top" and "bottom" edges of the blades 25, although under some circumstances such walls may be provided.

In the preferred embodiment illustrated in the drawings, a common wall member 29 is provided between the vacuum pump 23 and the fluidizing pump, and means are provided defining gas passageways from the collecting bubble to the vacuum pump. The gas passageway defining means are illustrated most clearly in FIGS. 2 and 1, and include a central opening 31 in the portion of housing 11 through which the shaft 14 passes (common wall 29), to an open annular volume 33 in the common wall 29, and through a progressively varying width, "french curve" shaped opening 34 in that portion of the common wall 29 just above the impeller blades 25. This gas passage 34 is also shown in dotted line in FIG. 4.

Figure 2:
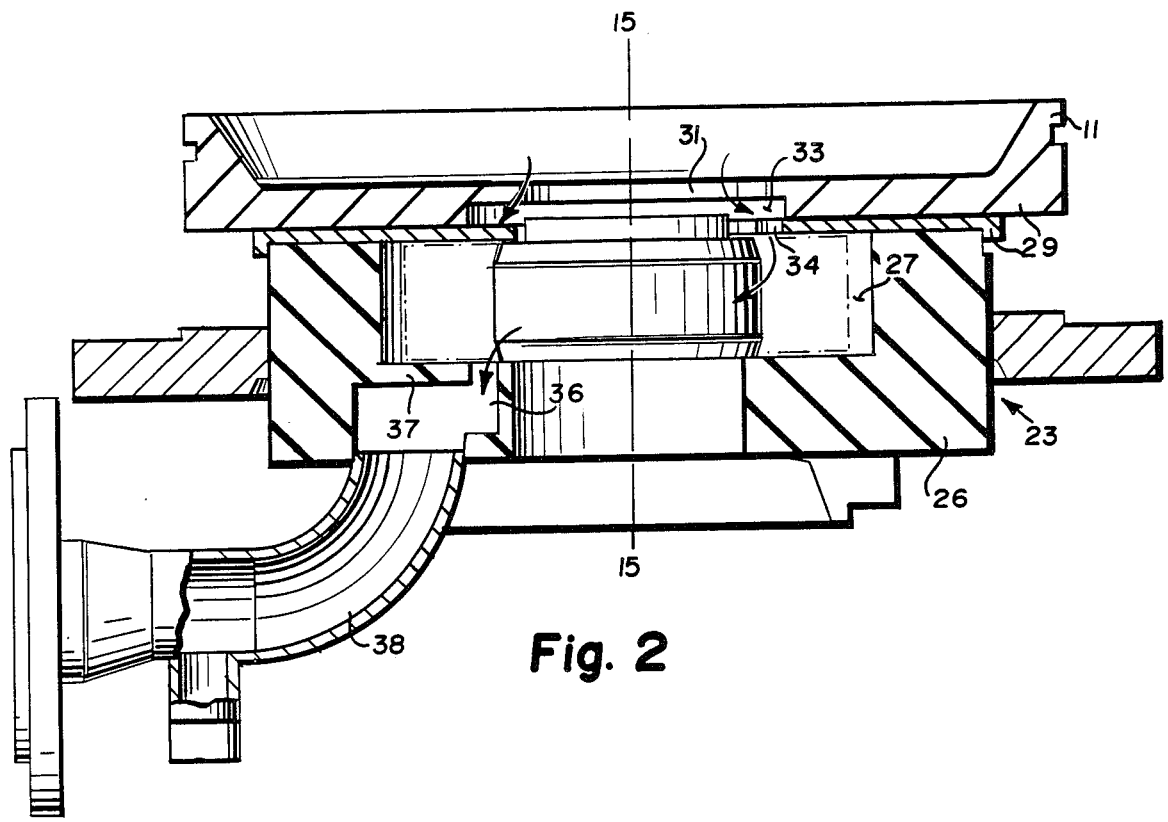
FIG. 2 is a vertical cross-sectional view of primarily just the vacuum pump portion of the pump of FIG. 1, taken at a section rotated approximately 90° from the view of FIG. 1.

The construction of the vacuum pump 23 is such that collected gas withdrawn from the housing 11 by the vacuum pulled by the vacuum pump 23 will pass as indicated by the arrows in FIG. 2, generally parallel to the axis 15—15, moving through the opening 34, past the impeller blades 25, and expelled through a gas outlet 36 in a wall portion 37 of the vacuum pump housing 26, opposite from the common wall 29. The gas outlet 36 has a shape and dimensions comparable to the inlet opening 34, and may be seen in FIGS. 2, 3, and 4. The gas outlet 36 communicates with pipe 38 which ultimately expels the gas to the atmosphere, or the like.

Figure 4:
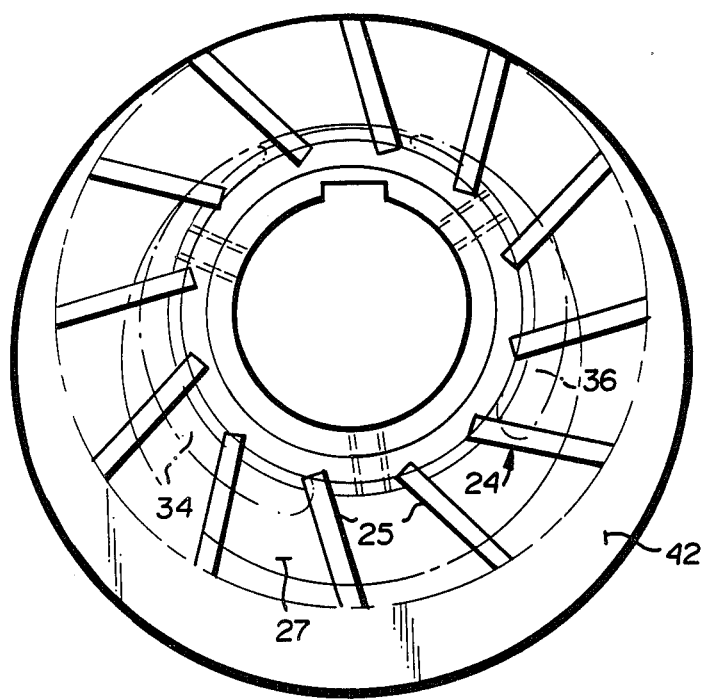
FIG. 4 is a schematic horizontal cross-sectional view of the vacuum pump portion of the pump of FIG. 1.

As is conventional in the operation of a vacuum pump, it is necessary to provide a liquid ring in the vacuum pump 23. A liquid inlet conduit 40 is illustrated in FIG. 1 to supply liquid to the vacuum pump chamber 27. FIG. 4 schematically illustrates the liquid ring—see reference numeral 42. In accordance with the present invention the inner edge of the liquid ring 42 is defined by the outer edge of the gas outlet 36. Thus the gas outlet 36 provides the combined functions of allowing the gas from bubble 21 to be expelled and preventing the liquid ring 42 from getting any bigger than is necessary for proper operation of the vacuum pump 23.

Provision is made in the housing 11 to ensure that the gas bubble 21 is at least a certain size before gas is withdrawn. This is provided for by means defining a plurality (e.g. four circumferentially spaced) openings 45 in the disc 19. When the diameter of the bottom portion of the gas bubble 21 is greater than the spacing between openings 45 on opposite sides of shaft 14, gas will pass through the openings 45 to the gas passageway means 31, 33, 34, etc. When the gas bubble 21 diameter is not larger than that spacing, however, insufficient gas will be available to be pulled through the vacuum pump 23, which will cause the degree of vacuum (negative pressure) to increase. This increase in negative pressure could cause suspension to be undesirably pulled into the vacuum pump, and in order to prevent this contingency a source of make-up atmospheric gas is provided.

The source of make-up gas is preferably provided by the conduit 47 (see FIGS. 1 and 3) which communicates with the atmosphere and leads atmospheric gas into the annular volume 33 via passage 48 in the common wall 29. A conventional pressure responsive valve, shown only schematically at reference numeral 50 in FIG. 1, is mounted in the conduit 47, and when the negative pressure (vacuum pulled) by the vacuum pump 23 exceeds a predetermined value (e.g. is less than 0.7 bars), atmospheric air will flow through conduit 47 to the vacuum pump 23, to be expelled thereby.

It has fortuitously been found that the speed of rotation of the shaft 14, which typically is between about 1,500–3,000 rpms, for effecting fluidizing of the suspension is within the rotational speed range for proper operation of the vacuum pump 23. Also, since the vacuum pump requires relatively little power (e.g. about 6–9 kW) compared to the conventional size of motor utilized with a fluidizing pump (e.g. 90–250 kW), the vacuum pump 23 can be mounted commonly with the fluidizing impeller 16 on the shaft 14 without increasing the size of the motor (shown schematically at 52 in FIG. 1).

In operation, the motor 52 rotates the shaft 14 at between about 1,500–3,000 rpms, the impeller 16 fluidizing the suspension having a consistency of about 6–15%, expelling the suspension with pumping force out outlet 13, and separating gas from the suspension, the gas collecting in bubble 21. When the diameter of the bubble 21 exceeds the spacing between the opposite holes 45, gas from bubble 21 passes through the openings 45, through the gas passageways 31, 33, and 34, into and past the vacuum pump chamber 27 containing impellers 25, and is expelled through gas outlet 36, moving in a direction generally parallel to the axis of rotation 15—15, and opposite the common wall 29. Liquid to define a liquid ring in the vacuum pump 23 is continuously available through conduit 40, with an excess liquid passing through opening 36 with the expelled gas. Should the negative pressure become too great, make-up air flows through valve 50 in conduit 47 through passage 48 into annular volume 33, and to the vacuum pump 23.

It will thus be seen that according to the present invention withdrawal of gas separated by a fluidizing pump can be effected without any accessory equipment, utilizing a vacuum pump mounted on the same shaft as the fluidizing pump, and without disturbing the conventional configuration or design of commercial fluidizing pumps. While the invention has been herein shown and described in what is presently conceived to be the most practical and preferred embodiment thereof, it will be apparent to those of ordinary skill in the art that many modifications may be made thereof within the scope of the invention, which scope should be accorded the broadest interpretation of the appended claims so as to encompass all equivalent structures and procedures.

What is claimed is:

1. A pump comprising: a main housing including a suspension inlet and a suspension outlet generally transverse to said suspension inlet; a shaft rotatable about an axis of rotation generally in alignment with said inlet; a fluidizing impeller mounted to said shaft for rotation therewith for effecting fluidization of suspension pumped by said impeller from said inlet to said outlet, said fluidizing impeller comprising a first section having impeller blades elongated in a first dimension generally parallel to said axis of rotation, and comprising second impeller blade portions extending in a dimension generally perpendicular to said first impeller blade portions, said fluidizing impeller when rotating causing gas to separate from the suspension and to collect adjacent said shaft and said second impeller blade portions; a vacuum pump including a vacuum pump housing and a vacuum impeller, said vacuum impeller mounted to said shaft for rotation with said shaft and said fluidizing impeller; means defining gas passageways extending between said main housing where gas collects to said vacuum impeller, to be exhausted from said main housing, to an area remote from said main housing, by said vacuum pump; said vacuum pump housing having a common wall with said main housing; means defining an open annular volume in said common wall; and means for providing make-up air to said open annular volume to flow with gas exhausted from said main housing.

2. A pump as recited in claim 1 wherein said vacuum pump further comprises a vacuum pump housing, said wall extending generally transverse to said axis of rotation, and disposed adjacent said second fluidizing impeller blade portions; and wherein said means defining gas passageways define gas passages in said common wall.

3. A pump as recited in claim 2 wherein said gas passageway defining means defines a gas passageway from said main housing through said common wall and said vacuum pump, past said vacuum impeller, to exhaust through a gas outlet from said vacuum pump housing through a portion thereof opposite said common wall.

4. A pump as recited in claim 3 further comprising means for supplying liquid to said vacuum pump to provide a liquid ring on the periphery of said vacuum pump, said gas outlet defining the inner edge of said liquid ring, excess liquid from said liquid ring passing out said gas outlet with the expelled gas.

5. A pump as recited in claim 1 further comprising pressure responsive means operatively associated with said make-up air inlet for providing a flow of atmospheric air into said open annular volume when the vacuum pulled by said vacuum pump exceeds a predetermined value.

6. A pump as recited in claim 5 wherein said gas passageway defining means defines a gas passageway from said main housing through said common wall and said vacuum pump, past said vacuum impeller, to exhaust through a gas outlet from said vacuum pump housing through a portion thereof opposite said common wall.

7. A pump as recited in claim 6 further comprising means for supplying liquid to said vacuum pump to provide a liquid ring on the periphery of said vacuum pump, said gas outlet defining the inner edge of said liquid ring, excess liquid from said liquid ring passing out said gas outlet with the expelled gas.

8. A pump as recited in claim 7 further comprising a disc-shaped member engaging said fluidizing impeller second portions, said fluidizing impeller second portions extending generally radially along said disc-shaped member; and further comprising means defining a plurality of openings in said disc for communicating with said means defining gas passageways.

9. A pump as recited in claim 8 wherein said openings in said disc-shaped member are radially spaced from said shaft.

10. A pump as recited in claim 1 further comprising a disc-shaped member engaging said fluidizing impeller second portions, said fluidizing impeller second portions extending generally radially along said disc-shaped member; and further comprising means defining a plurality of openings in said disc for communicating with said means defining gas passageways, radially spacd from said shaft.

11. A pump as recited in claim 1 wherein said gas passageway defining means defines a path of expelled gas from the volume of collected gas adjacent said fluidizing impeller second blades on said shaft, in a direction generally parallel to said axis of rotation, through said vacuum pump past said vacuum impeller, and expelled from said vacuum pump in a dimension generally parallel to said axis of rotation and spaced from said main housing.

12. A pump as recited in claim 1 wherein said vacuum impeller includes generally radially extending blades and is devoid of wall components extending generally perpendicular to said axis of rotation and defining the limits of said blades.

13. A method of simultaneously pumping and degassing a suspension having a solids content between about 6-15% utilizing a fluidizing impeller in a main housing rotatable by a shaft, and a vacuum impeller mounted on the same shaft as the fluidizing impeller, for rotation therewith about the axis of rotation, comprising the steps of:
feeding the suspension having a consistency between about 6-15% into operative association with the fluidizing impeller;
rotating the fluidizing impeller continuously at high speed, the impeller effective pumping of the suspension and removing gas from the suspension, the gas tending to collect adjacent the shaft;
withdrawing the gas from its collecting volume with the vacuum pump, the gas being pulled from the collecting volume generally parallel to the axis of rotation, through the vacuum pump past the vacuum pump impeller, and expelled from the opposite side of the vacuum pump as the fluidizing impeller; and
supplying atmosphere make-up gas to the flow of gas drawn into the vacuum pump in response to the vacuum pump pulling a vacuum greater than predetermined amount.

14. A method as recited in claim 13 wherein the step of providing make-up gas is practiced by providing a pressure responsive valve set for approximately 0.7 bar between the atmosphere and the flow of gas being pulled into the vacuum pump.

15. A pump including a fluidizing impeller housing having a first inlet and first outlet, and second outlet; a vacuum impeller housing having a gas inlet, gas outlet, and liquid inlet; a shaft mounted for rotation about an axis; a fluidizing impeller mounted to said shaft for rotation therewith, and disposed in said fluidizing impeller housing; a vacuum pump impeller mounted to said shaft for rotation therewith and disposed in said vacuum pump housing; means defining gas passageways between said second outlet and said gas inlet, said second outlet being disposed adjacent, and extending generally parallel to, said axis of rotation and said gas passageway defining means defines a gas passageway in a common wall between said fluidizing impeller housing and said vacuum pump impeller housing; said gas outlet extending from the opposite said of said vacuum pump impeller from said second outlet; and means for supplying make-up atmospheric gas to an open annular volume in said common wall in response to the vacuum being pulled by the vacuum pump impeller being more than a predetermined amount.

16. A pump as recited in claim 15 further comprising means for supplying liquid to said vacuum pump to provide a liquid ring on the periphery of said vacuum pump, said gas outlet defining the inner edge of said liquid ring, excess liquid from said liquid ring passing out said gas outlet with the expelled gas.

17. A pump as recited in claim 15 wherein said means for providing make-up air to said open annular volume includes pressure responsive means for providing a flow of atmospheric air into said open annular volume when the vacuum pulled by said vacuum pump exceeds a predetermined value.

* * * * *